July 17, 1928.
J. O. BOVING
1,677,265
AIR LIFT PUMP
Filed Aug. 27, 1925
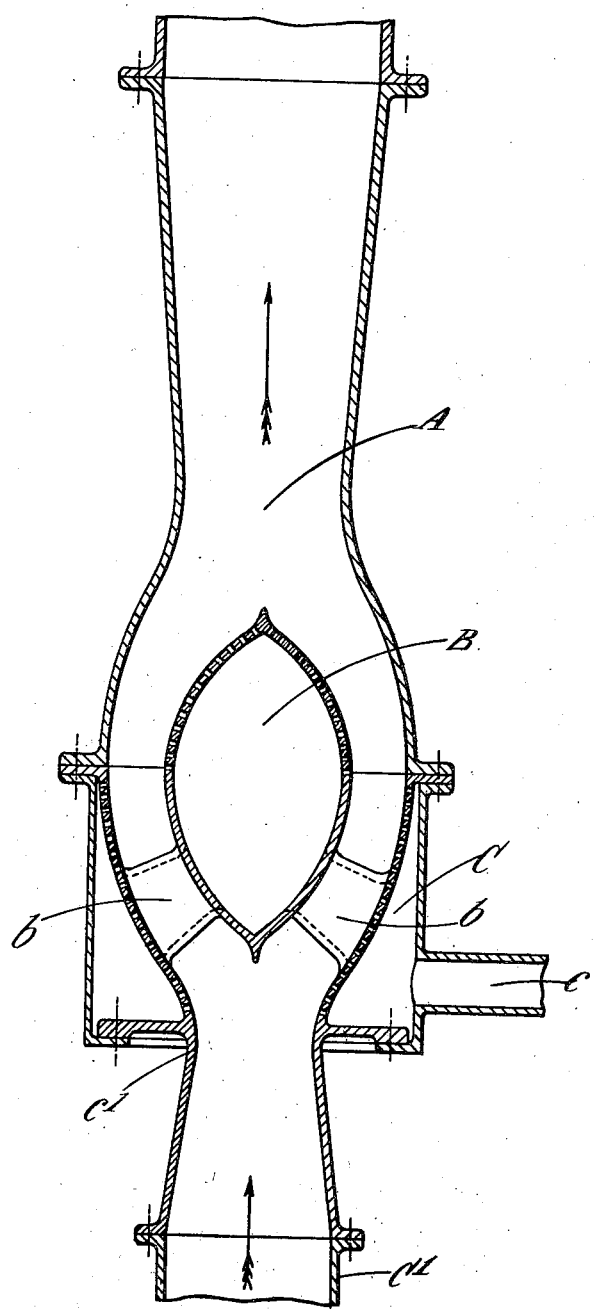
INVENTOR
Jens Orten Boving
BY
Pennie Davis Marvin & Edmonds
ATTORNEYS Patented July 17, 1928.

1,677,265

UNITED STATES PATENT OFFICE.

JENS ORTEN BOVING, OF WESTMINSTER, ENGLAND.

AIR-LIFT PUMP.

Application filed August 27, 1925, Serial No. 52,835, and in Great Britain August 29, 1924.

This invention relates to liquid pumps of the air-lift type, i. e. of the type in which the liquid is raised in an uptake or ascension pipe by means of compressed air admitted to the pipe at or near its lower end. In such pumps as previously constructed or proposed the compressed air has been introduced either axially through a single jet from the bottom of the ascension pipe, laterally through a space between adjacent parts of the said pipe, or radially through a number of holes in the pipe. In all these arrangements incomplete aeration of the liquid takes place so that a comparatively inefficient action is obtained, and the chief object of the present invention is to provide for more complete aeration and a consequent increase of efficiency.

According to the present invention the lower part of the ascension pipe is provided with a hollow central member so as to form a space between it and the pipe and/or an extension of this pipe, the liquid to be lifted flowing through this space, and provision is made for admitting compressed air into the said space outwardly through the said hollow member and inwardly through the pipe and/or its extension. In this manner the air mixes effectively with both the inner and outer layers of the body of the liquid flowing through the said space and efficient aeration of the liquid thus takes place. In its simplest form the said hollow member may be in the form of a laterally perforated pipe with its upper end either closed or perforated, this pipe being arranged coaxially within the lower end of the ascension pipe which is formed with perforations or their equivalent, but in the preferred construction the hollow member is of ovoid or similar shape communicating by means of hollow webs with a compressed air casing surrounding the pipe and/or its extension which is formed with perforations whilst the said hollow member is also formed with perforations. The portion of the pipe below the hollow member is preferably formed with a constriction or throat of such size as to increase the velocity of the liquid to at least ten per cent of the spouting velocity corresponding to the immersion head and above this point the annular area of the space between the pipe and the hollow member is increased in correct relationship to the increase in the volume of the liquid due to the admission of the compressed air, so that the velocity of flow of the aerated liquid through this space is substantially constant. Above the said hollow member the velocity of the aerated liquid is gradually reduced by making the pipe of progressively increasing cross-sectional area for the required portion of its length.

In order that the said invention may be clearly understood and readily carried into effect, the same will now be described more fully with reference to the accompanying drawing which shows diagrammatically a constructional form of the invention.

A is the ascension pipe and B is the hollow member of ovoid shape connected by hollow webs $b$, $b$ to the upper part of a pipe $C^1$ having a surrounding casing C so that communication is established by the said hollow webs between the interior of the said casing and the interior of the hollow member B, compressed air being led to the casing C by a pipe $c$. The said pipe $C^1$ forms an extension of the ascension pipe A and dips into the liquid to be raised. The upper part of the hollow member B is perforated as shewn by small holes as is also the upper part of the extension pipe $C^1$. This extension pipe is formed with a throat or constriction $c^1$ of such a size that, as aforesaid, the velocity of the liquid flowing in this pipe is increased above the constriction to at least ten per cent of the spouting velocity corresponding to the immersion head and this increased velocity is maintained in the annular space between the hollow member B and the upper part of the extension pipe $C^1$ by the gradual increase in the cross-sectional area of this annular space, this increase corresponding approximately to the increase in volume of the liquid due to the admission of air through the holes in the extension pipe $C^1$. This increase is progressive in the annular space between the upper half of the hollow member B and the lower curved part of the ascension pipe A to correspond with the further increase in the volume of the liquid as a result of the additional air passing into the liquid through the holes in the said upper half of the hollow member, so that a constant velocity of flow is maintained between the constriction $c^1$ and a point somewhat above the top of the hollow member, beyond which point the pipe A increases in cross-sectional area so as to reduce the velocity of flow, the kinetic energy of the aerated liquid being thus transferred into static energy. It will be observed that the cross-sectional area of the throat of the pipe A above the top of the hollow member B is substantially greater than the cross-sectional area of the constriction $c^1$.

Although in the construction shown the holes in the hollow member B and those in the extension pipe $C^1$ are not directly opposite each other, they might, by varying the construction, be made directly opposite or approximately so. In any case the compressed air enters the inner and outer layers of the annular body of liquid flowing past the hollow member B so that effective intermingling of the air and liquid is obtained.

What I claim and desire to secure by Letters Patent of the United States is:—

1. In a liquid pump of the type in which the liquid is raised in an uptake or ascension conduit by means of gas under pressure admitted to this conduit at or near its lower end, the combination with the said conduit of a hollow member disposed within the lower part thereof so as to leave a space between said member and said lower part of the conduit, said member having an inwardly leaning part and said conduit an outwardly leaning part, means for admitting the gas under pressure into said space outwardly through the inwardly leaning part of said hollow member, and means for admitting gas under pressure into said hollow member, and means for admitting gas under pressure into said space inwardly through the outwardly leaning part of the wall of said conduit so that both supplies of gas during their ascent immediately after they enter the liquid pass through the latter at a considerable angle to the direction of flow of the liquid and efficient admixture of the gas and liquid is thereby obtained.

2. In a liquid pump of the type in which the liquid is raised in an uptake or ascension pipe by means of gas under pressure admitted to this pipe at or near its lower end, the combination with the said pipe of a hollow member disposed within the lower part thereof so as to leave an annular space between said member and said lower part of the pipe, said member having an inwardly leaning part and said pipe an outwardly leaning part, means for admitting the gas under pressure into said space outwardly through the inwardly leaning part of said hollow member, and means for admitting gas under pressure into said hollow member, and means for admitting gas under pressure into said space inwardly through the outwardly leaning part of the wall of said conduit so that both supplies of gas during their ascent immediately after they enter the liquid pass through the latter at a considerable angle to the direction of flow of the liquid and efficient admixture of the gas and liquid is thereby obtained.

3. In a liquid pump of the type in which the liquid is raised in an uptake or ascension pipe by means of gas under pressure admitted to this pipe at or near its lower end, the combination with the said pipe of a hollow member disposed within the lower part of said pipe so as to leave an annular space between said member and said lower part, said member having an inwardly leaning part and said pipe an outwardly leaning part, a casing surrounding said lower part, means for supplying gas under pressure to said casing, means for admitting the gas into said annular space outwardly through the inwardly leaning part of said hollow member, means for admitting gas under pressure into said hollow member, and means for admitting gas under pressure into said space inwardly through the outwardly leaning part of the wall of said pipe so that both supplies of gas during their ascent immediately after they enter the liquid pass through the latter at a considerable angle to the direction of flow of the liquid and efficient admixture of the gas and liquid is thereby obtained.

4. In a liquid pump of the type in which the liquid is raised in an uptake or ascension pipe by means of gas under pressure admitted to this pipe at or near its lower end, the combination with the said pipe of a hollow member of substantially ovoid shape disposed within the lower part of said pipe so as to leave an annular space between said member and said lower part, said member having an inwardly leaning part and said pipe an outwardly leaning part, a casing surrounding said lower part, means for supplying gas under pressure to said casing, means for admitting the gas from said casing into said annular space outwardly through the inwardly leaning part of said hollow member, means for admitting gas under pressure into said hollow member, and means for admitting gas under pressure into said space inwardly through the outwardly leaning part of the wall of said pipe so that both supplies of gas during their ascent immediately after they enter the liquid pass through the latter at a considerable angle to the direction of flow of the liquid and efficient admixture of the gas and liquid is thereby obtained.

5. In a liquid pump of the type in which the liquid is raised in an uptake or ascension pipe by means of gas under pressure admitted to this pipe at or near its lower end, the combination with the said pipe of a hollow member of substantially ovoid shape disposed within the lower part of said pipe so as to leave an annular space between said member and said lower part, said member having an inwardly leaning part and said pipe an outwardly leaning part, an extension of said pipe, hollow webs connecting said member and said extension, a casing surrounding said extension, means for supplying gas under pressure to said casing, means for admitting the gas from said casing into said annular space outwardly through the inwardly leaning part of said extension means for admitting gas under pressure into said hollow member, and means for admitting gas under pressure into said space inwardly through the outwardly leaning part of the wall of said pipe so that both supplies of gas during their ascent immediately after they enter the liquid, pass through the latter at a considerable angle to the direction of flow of the liquid, and efficient admixture of the gas and liquid is thereby obtained.

6. In a liquid pump of the type in which the liquid is raised in an uptake or ascension conduit by means of air under pressure admitted to this conduit at or near its lower end, the combination with the elements claimed in claim 1, of a portion of the conduit below the hollow member formed with a constriction or throat of such size as to increase the velocity of the liquid to at least ten per cent of the spouting velocity corresponding to the immersion head and above this point the annular area of the space between the conduit and the hollow member is increased in correct relationship to the increase in the volume of the liquid due to to the admission of the compressed air, so that the velocity of flow of the aerated liquid through this space remains substantially constant.

7. In a liquid pump of the type in which the liquid is raised in an uptake or ascension pipe by means of air under pressure admitted to this pipe at or near its lower end, the combination with the elements claimed in claim 4, of a portion of the pipe below the hollow member formed with a constriction or throat of such size as to increase the velocity of the liquid to at least ten per cent of the spouting velocity corresponding to the immersion head and above this point the annular area of the space between the pipe and the hollow member is increased in correct relationship to the increase in the volume of the liquid due to the admission of the compressed air, so that the velocity of flow of the aerated liquid through this space remains substantially constant.

8. In a liquid pump of the type in which the liquid is raised in an uptake or ascension pipe by means of air under pressure admitted to this pipe at or near its lower end, the combination with the elements claimed in claim 4, of a portion of the ascension pipe above the level of the top of the hollow member made of progressively increasing cross-sectional area so as to gradually reduce the velocity of the aerated liquid.

9. In a liquid pump of the type in which the liquid is raised in an uptake or ascension pipe by means of gas under pressure admitted to this pipe at or near its lower end, the combination with the said pipe of a hollow member of substantially ovoid shape disposed within the lower part of said pipe so as to leave an annular space between said member and said lower part, perforations in the upper part of said hollow member for admitting the gas under pressure outwardly into said annular space, said perforations being opposite an unperforated portion of the lower part of the pipe and the lower part of said hollow member being unperforated, perforations in the lower part of said pipe for admitting the gas under pressure inwardly into said annular space, the latter perforations being opposite the lower unperforated portion of said hollow member.

10. In a liquid pump of the type in which the liquid is raised in an uptake or ascension pipe by means of gas under pressure admitted to this pipe at or near its lower end, the combination with the said pipe of a hollow member of substantially ovoid shape provided with an inwardly leaning part and disposed within the lower part of said pipe so as to leave an annular space between said member and said lower part, said lower part being shaped with an outwardly leaning portion so as to conform substantially with the ovoid shape of the hollow member, perforations in the inwardly leaning upper part of said hollow member for admitting the gas under pressure outwardly into said annular space, said perforations being opposite an unperforated portion of the lower part of the said pipe and the lower part of the said hollow member being unperforated, and perforations in the outwardly leaning lower part of said pipe for admitting the gas under pressure inwardly into said annular space, the latter perforations being opposite the lower unperforated portion of the said hollow member.

JENS ORTEN BOVING.